June 9, 1953 D. GUREVICS 2,641,626

ATTENUATING VACUUM TUBE VOLTMETER

Filed Sept. 4, 1948 2 Sheets-Sheet 1

DAVID GUREVICS
INVENTOR.
BY Theodore Hafner
ATTORNEY

DAVID GUREVICS
INVENTOR.
BY Theodore Hafner
ATTORNEY

Patented June 9, 1953 2,641,626

UNITED STATES PATENT OFFICE 2,641,626

ATTENUATING VACUUM TUBE VOLTMETER

David Gurevics, New York, N. Y., assignor to Freed Transformer Company, Inc., a corporation of New York Application September 4, 1948, Serial No. 47,781

2 Claims. (Cl. 171—95)

This invention relates to attenuating devices especially of the electronic type.

Generally, the attenuation of electrical energy is accompanied by relatively great loss and restricted by distortion to relatively narrow frequency ranges.

One of the objects of the invention is to obtain energy attenuation within a rather broad frequency band and with a minimum of loss.

Another object of the invention is to permit the attenuation of energy of rather high potential and provide simple attenuating devices having a very high or practically infinite input impedance.

Another object of the invention is an amplifier of the inverted type including one or more stages, parallel or series connected, having an input circuit connected to the anode or another relatively high potential electrode, and an output circuit connected to the cathode or another relatively low potential electrode.

The amplifier may contain several stages connected in parallel or pushpull, or in cascade. In the latter case, the cathode or output circuit of the first stage may be connected to the anode or input circuit of the second stage. In this way, any desired amount of input energy, otherwise unmanageable because of its relatively high potential, may be converted into any amount of output energy which will be manageable because of its relatively low potential.

The amplifier may have any desired amplification characteristic, straight, or curved, in accordance with the desired characteristic of the output voltage.

Any sort of tube is usable. Triodes have been found practical, especially those generally used for inverse amplification purposes. However, the invention may also be applied to other tubes, especially multi-grid tubes such as tetrodes or pentodes.

In such cases, input and output circuits of the attenuator may not only be applied to anode and cathode respectively, but also to auxiliary or equivalent electrodes connected to or coupled to anode or cathode.

The remaining features of the attenuator amplifier may be more or less conventional.

The control grid should be maintained at a potential relatively close to, or slightly for example, about 20% below the potential of the anode or an equivalent electrode of the amplifier.

A cathode bias has been found useful for determining the characteristic of inverse amplification of the attenuator. However, other biasing methods may equally well be used in connection with appropriate tubes and circuits.

In order to protect the anode circuit the anode or equivalent electrode may be grounded over relatively high resistance. The anode resistance for example may be higher and of a different order of magnitude, say 100 times higher, than the corresponding grounding or biasing resistance of the cathode circuit.

A specific object of the invention is a voltage metering circuit, especially one of the electronic type, where an electronic attenuator is used to control a tube voltmeter. This permits the evaluation of very high voltages with extreme accuracy and over a very broad frequency range, without requiring any substantial change in the structure of available tube voltmeters.

A still more specific object of the invention is a voltage metering circuit adapted to measure the relatively high voltage existing across a condenser connected in series resonant circuits of relatively high Q value such as may be caused by the insertion of an iron core inductance or transformer. Heretofore the accurate or direct determination of such high Q values was extremely difficult if not impossible due to the high voltage and practical infinite impedance existing across the terminals of the adjustable condenser used for bringing the Q metering circuit to resonance.

In accordance with the invention an electronic attenuator coupling the condenser with an appropriate standard voltmeter such as an ordinary tube meter will permit exact measuring of the high voltage. The Q value of a coil connected in series with the condenser and an oscillator may thus be derived from the well known formula, $Q=E_{con}/E_{osc}$ wherein $E_{con}$ is the condenser voltage and $E_{osc}$ the oscillator voltage.

In this way, with one and the same simple instrument, extremely high Q values, up to several thousands, may be determined for practically the entire useful frequency range.

These and other objects of the invention will be further described in connection with the accompanying drawings in which.

Figure 1:
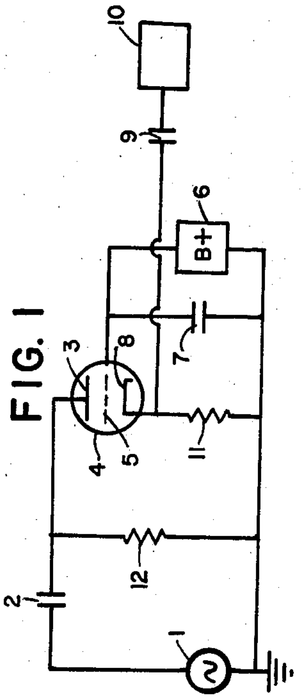
Figure 1 shows the principal diagram of an electronic attenuator embodying the invention.

In Figure 1, 1 is a high voltage input source coupled over condenser 2 to the anode 3 of a triode 4. The grid 5 is connected to the positive terminal of a source 6 of high potential of the order of or less than the input voltage. Grid 5 is also coupled over a high capacity condenser 7 to ground or to the other terminal of source 1. The cathode 8 is connected over a coupling condenser 9 to a load device 10, and also connected over a relatively low biasing resistance 11 to ground or to the other terminal of source 1. Anode 3 is also connected over a relatively high resistance 12 to ground or to the other terminal of source 1.

With a more or less conventional tube and circuit, an inverse amplification factor of about 1:100 may be obtained.

Figure 2:
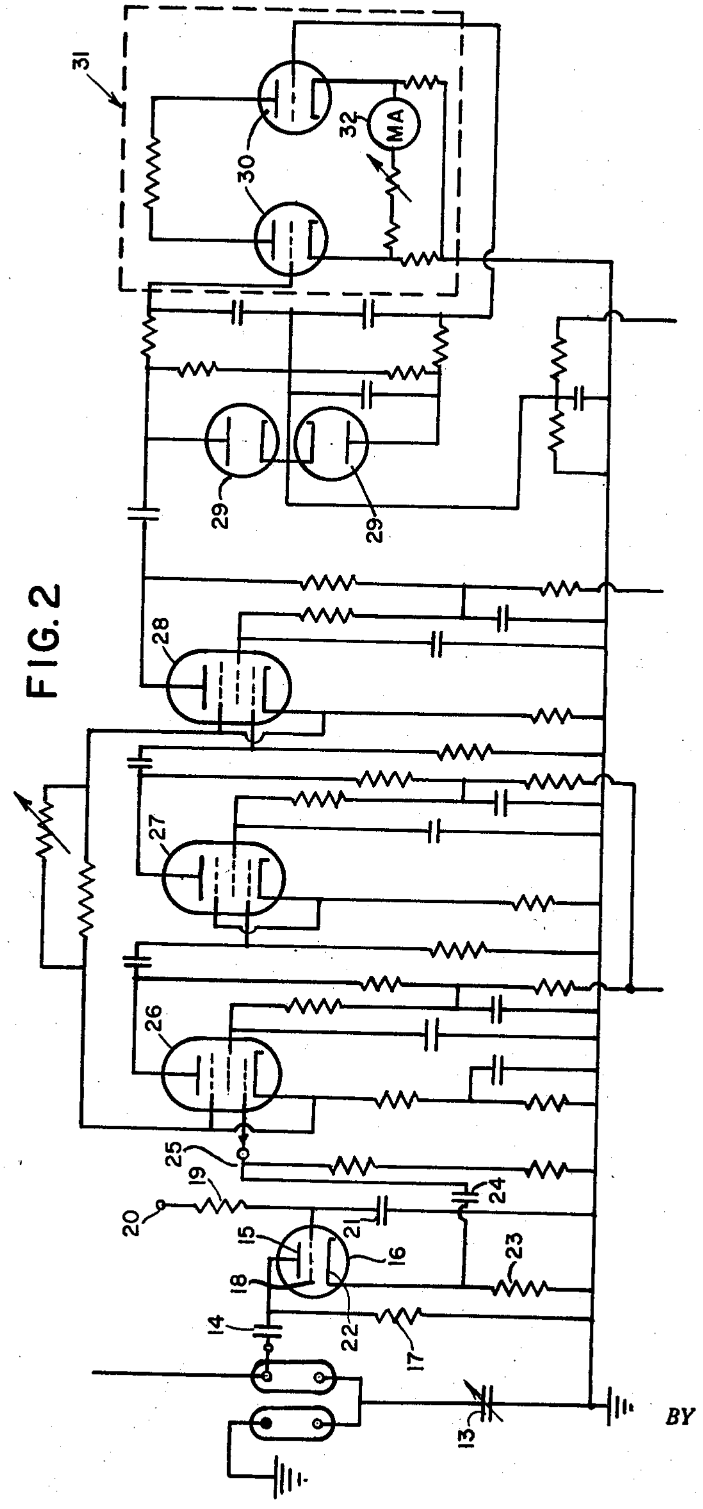
Figure 2 shows an electronic attenuator tube as applied over one or more ordinary amplifier stages to a tube voltmeter.

In Figure 2, 13 is a variable condenser which may be part of an otherwise well known Q metering or series resonant circuit (not shown). The voltage across the condenser which is to be measured may be relatively high, say of the order of 150 volts. One terminal of condenser 13 is connected over a coupling condenser 14 of about .01 microfarad to anode 15 of a triode 16 of the 6J5 type. The other terminal of condenser 13 is grounded. Anode 15 is also grounded over a resistor 17 of about 100 megohms. Grid 18 of triode 16 is connected over an appropriate resistance 19 to the positive terminal of a direct current source 20, of say 150 volts. Grid 18 is also coupled over a condenser 21 of 8 microfarads to ground. Cathode 22 is biased by a resistance 23 and coupled over a condenser 24 of say 2 microfarads to the grid or input circuit 25 of a three stage amplifier including the three pentodes 26, 27 and 28. The output circuit of the last pentode 28 is coupled over rectifiers 29 to the input circuit of amplifier stages 30 which are part of a tube voltmeter 31 containing in its output circuit, as measuring instrument, the milliameter 32.

Figure 3:
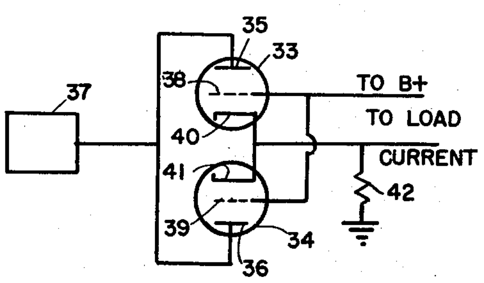
Figure 3 shows an electronic attenuator comprising several tube stages in parallel.

In Figure 3, two triodes 33, 34 have anodes 35, 36 connected in parallel to the common input oscillator 37. The two grids 38, 39 are interconnected and connected (in a manner not shown) to a common source of high potential. The cathodes 40, 41 are also interconnected and the common connection is taken over a resistance 42 to ground, and also in a manner not shown but similar to that shown in Figure 1, to a common load circuit.

Figure 4:
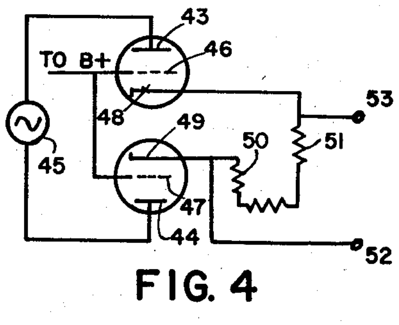
Figure 4 shows an electronic attenuator with a pair of tubes connected in pushpull.

Figure 4 shows a pair of electronic attenuators embodying the invention and arranged in pushpull. There, the two anodes 43, 44 are connected in series with a common source of oscillation 45. The two grids 46, 47 are interconnected and connected to plus B, the positive terminal of a source of high D. C. voltage. The two cathodes 48, 49 are connected in parallel over separate grounding resistors 50, 51 to ground; the output of the attenuator is taken from terminals 52, 53.

Figure 5:
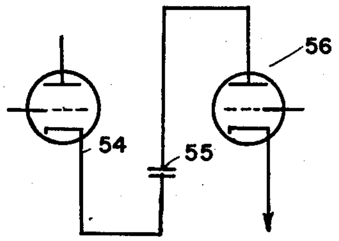
Figure 5 shows an electronic attenuator consisting of two attenuating stages connected in cascade.

Figure 5 shows two attenuators arranged in cascade. The cathode output of one attenuator stage 54 is taken over a coupling condenser 55 to the anode of a second attenuator stage 56 from the cathode of which the output is derived in a manner already explained above. By cascading several stages, any amount of inverse amplification and any amount of attenuation may be obtained.

Figure 6:
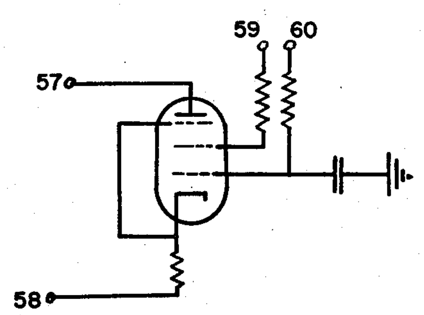
Figure 6 shows an electronic attenuator employing a pentode; the screen grid being used as an input electrode.

Figure 6 shows an electronic attenuator consisting of a pentode with input and output circuits being applied to or taken off at 51—58, and 59, 60, respectively.

A screen grid tube may be used in similar arrangement except that the suppressor grid may be tied to the cathode.

The pentode tube may also be replaced by a remote control cut-off tube such as a variable $\mu$ tube, without exceeding the scope of this invention.

What I claim is:

1. In a voltage metering circuit adapted to measure a relatively high A. C. voltage across a variable condenser connected in a series resonant circuit of relatively high Q, a tube volt meter, a source of high D. C. potential, a vacuum tube arrangement including an anode type electrode coupled to said condenser, a cathode type output electrode coupled to said tube volt meter; and a grid type electrode coupled to said D. C. source at the positive terminal thereof; the negative terminal being resistance coupled to said anode type and cathode type electrodes respectively.

2. Device according to claim 1 wherein said vacuum tube arrangement consists of a triode comprising, a high voltage A. C. input source capacity coupled to the anode of said triode, and a source of high D. C. potential of the order of less than that of the input voltage and coupled to the grid of the triode; the grid of said triode being also capacity coupled to ground and the cathode of said triode being capacity coupled to control said tube volt meter; a relatively low biasing resistance coupling the cathode to ground; and a relatively high resistance coupling the anode to ground.

DAVID GUREVICS.

References Cited in the file of this patent

UNITED STATES PATENTS

| Number | Name | Date |
|---|---|---|
| 1,846,043 | Terman | Feb. 23, 1932 |
| 1,938,136 | Crew | Dec. 5, 1933 |
| 2,037,202 | Terman | Apr. 14, 1936 |
| 2,271,738 | Leftwich | Feb. 3, 1942 |
| 2,276,152 | Bull et al. | Mar. 10, 1942 |
| 2,350,545 | Bradford | June 6, 1944 |
| 2,400,734 | Beckwith | May 21, 1946 |
| 2,413,389 | Smith | Dec. 31, 1946 |
| 2,449,621 | Roberts | Sept. 21, 1948 |
| 2,499,423 | Selinger | Mar. 7, 1950 |